United States Patent [19]

Kroenke

[11] 4,235,770

[45] Nov. 25, 1980

[54] AMMELINIUM BETA-OCTAMOLYBDATE AND COMPOSITION CONTAINING SAME

[75] Inventor: William J. Kroenke, Brecksville, Ohio

[73] Assignee: The B. F. Goodrich Company, Akron, Ohio

[21] Appl. No.: 49,256

[22] Filed: Jun. 18, 1979

[51] Int. Cl.³ ...................... C08K 5/34; C07D 251/52
[52] U.S. Cl. .......................... 260/45.75 R; 260/429 R
[58] Field of Search ...................... 260/429 R, 45.75 R

[56] References Cited

U.S. PATENT DOCUMENTS

| | | | |
|---|---|---|---|
| 2,795,550 | 6/1957 | Harle | 260/429 R |
| 3,282,838 | 11/1966 | Knowles et al. | 260/429 R |
| 3,349,108 | 10/1967 | Marzluff | 260/429 R |
| 3,489,775 | 1/1970 | de Roch et al. | 260/429 R |
| 3,870,679 | 3/1975 | Mitchell | 260/45.75 R |
| 3,956,231 | 5/1976 | Moore | 260/45.75 R |
| 4,053,455 | 10/1977 | Kroenke | 260/45.75 R |
| 4,055,538 | 10/1977 | Kroenke | 260/45.75 R |
| 4,129,540 | 2/1978 | Kroenke | 260/45.75 R |

*Primary Examiner*—V. P. Hoke
*Attorney, Agent, or Firm*—James R. Lindsay

[57] ABSTRACT

Ammelinium beta-octamolybdate is disclosed as a novel amine molybdate and as a smoke retardant additive for vinyl chloride and vinylidene chloride polymer compositions.

4 Claims, No Drawings

AMMELINIUM BETA-OCTAMOLYBDATE AND COMPOSITION CONTAINING SAME

BACKGROUND OF THE INVENTION

Amine molybdates may be produced by reacting an amine with a molybdenum compound such as molybdenum trioxide ($MoO_3$), molybdic acid or a molybdenum salt in an acidic aqueous medium made acidic through the addition of a suitable acid such as an organic acid containing 1 to 12 carbon atoms (exemplified by acetic acid, propionic acid, benzoic acid, and the like) or an inorganic acid (exemplified by hydrochloric acid, nitric acid or sulfuric acid). The acidic mixture is refluxed, preferably while being stirred continuously, until the reaction is complete, usually for about $\frac{1}{4}$ to 4 hours.

Amine molybdates also may be produced, as described in my co-pending application Ser. No. 016,583, filed Mar. 1, 1979 and entitled "Process For Making Amine Molybdates," by reacting essentially stoichiometric quantities of molybdenum trioxide with an amine in an aqueous medium essentially free of acid and in which a water-soluble ammonium or monovalent metal or divalent metal or trivalent rare earth metal salt of an inorganic or organic acid is dissolved.

The particular amine molybdate formed may depend upon which process is used to form the amine molybdate and the quantity of reactants present in the reaction mixture, as well as the reaction conditions.

SUMMARY OF THE INVENTION

The present invention pertains to a novel amine molybdate, namely, ammelinium beta-octamolybdate, which exhibits major x-ray diffraction peaks at "d" spacings of 9.90Å, 9.15Å, 5.96Å, 3.62Å, 3.47Å, 3.30Å and 3.16Å. Like many other amine molybdates, ammelinium beta-octamolybdate functions as an effective smoke retardant additive for vinyl chloride and vinylidene chloride polymers.

DETAILED DESCRIPTION OF THE INVENTION

Ammelinium beta-octamolybdate may be produced by reacting ammonium dimolybdate [$(NH_4)_2Mo_2O_7$] and ammeline ($C_3H_5N_5O$) in essentially a 2/1 molybdenum/ammeline molar ratio in an acidic aqueous medium. Suitable acids include inorganic acids such as hydrochloric acid, nitric acid, sulfuric acid, and the like. Mixtures of acids may also be used. The amount of acid used may be varied widely from about $\frac{1}{2}$ to 10 or more molar equivalents of acid per molar equivalent of ammonium dimolybdate. However, about a 1/1 molar equivalent ratio is preferred. Sufficient water is included in the reaction mixture to insure a reaction medium that has a consistency that enables it to be easily stirred.

The preferred reaction method comprises adding an aqueous solution of the ammonium dimolybdate to an acidic ammeline-water solution, followed by refluxing the reaction mixture for 0.25 to 16 hours. Alternatively, the ammeline, ammonium dimolybdate, acid and water can be charged essentially simultaneously to the reaction vessel and the mixture thereafter refluxed during the period of reaction. The mixture preferably is stirred continuously while the reaction is occurring.

Although the reaction can occur at room temperature (25° C.), desirably the reaction mixture is heated to between 75° to 110° C. in order to reduce the time for the reaction to be completed.

Upon completion of the reaction, the solid crystalline ammelinium beta-octamolybdate formed can be separated from the liquid phase by filtration, centrifugation or other suitable separation means, washed with water, alcohol or a mixture of water and alcohol and then dried. The reacted mixture may be cooled to room temperature (about 25° C.) before the separation of the solid ammelinium beta-octamolybdate from the liquid phase, although cooling the mixture before the separation of the solid material from the liquid phase is not necessary. The recovered ammelinium beta-octamolybdate may be air dried, preferably at about 100° to 200° C., or may be vacuum dried, preferably at temperatures up to 150° C. and higher. The ammelinium beta-octamolybdate is readily identifiable by elemental, infrared or X-ray diffraction analysis.

The following example illustrates the preparation of the ammelinium beta-octamolybdate more fully:

EXAMPLE 1

Ammelinium beta-octamolybdate was prepared in the following manner. 10.00 grams of ammeline, 15.50 grams of a 37 percent hydrochloric acid solution and 200 milliliters of water were added to a 500 milliliter round-bottom flask equipped with a water-cooled condenser. The mixture was heated to reflux while the ammeline dissolved. 26.74 grams of ammonium dimolybdate were heated with 50 milliliters of water in a beaker until the ammonium dimolybdate dissolved in the water, after which the resulting solution was added to the 500 milliliter flask containing the ammeline dissolved in the acidic aqueous solution. The resulting mixture was refluxed for one hour while being continuously stirred, was cooled to room temperature and filtered. A white crystalline solid was recovered. The recovered solid was washed with water and vacuum dried for approximately 16 hours at 120° C. 30.33 grams of the crystalline solid were recovered. Elemental and infrared analyses identified the solid to be ammelinium beta-octamolybdate [$(H\ C_3H_5N_5O)_4Mo_8O_{26}$].

Ammelinium beta-octamolybdate has been found to be a smoke retardant additive for vinyl chloride and vinylidene chloride polymer compositions. When used as a smoke retardant additive, the ammelinium beta-octamolybdate desirably has an average particle size from about 0.01 to about 800 microns, preferably from about 0.1 to about 100 microns, and is present in an amount from about 0.1 to about 20 parts by weight per 100 parts by weight of the vinyl chloride or vinylidene chloride polymer.

Vinyl chloride and vinylidene chloride polymers with which the ammelinium beta-octamolybdate can be used as a smoke retardant additive include homopolymers, copolymers and blends of homopolymers and/or copolymers. The vinyl chloride and vinylidene chloride polymers may contain from 0 to about 50 percent by weight of at least one other olefinically unsaturated monomer. Suitable monomers include 1-olefins containing from 2 to 12 carbon atoms such as ethylene, propylene, 1-butene, isobutylene, 1-hexene, 4-methyl-1-pentene, and the like; dienes containing from 4 to 10 carbon atoms, including conjugated dienes such as butadiene, isoprene, piperylene, and the like; ethylidene norbornene and dicyclopentadiene; vinyl esters and allyl esters such as vinyl acetate, vinyl chloroacetate, vinyl propionate, vinyl laurate, alkyl acetate, and the like; vinyl aromatics such as styrene, α-methyl styrene, chlorostyrene, vinyl toluene, vinyl naphthalene, and the like; vinyl and allyl ethers and ketones such as vinyl methyl ether, allyl methyl ether, vinyl isobutyl ether, vinyl n-butyl ether, vinyl chloroethyl ether, methylvinyl ketone, and the like; vinyl nitriles such as acrylonitrile, methacrylonitrile, and the like; cyanoalkyl acrylates such as α-cyanomethyl acrylate, the α-, β- and γ-cyanopropyl acrylates, and the like, olefinically unsaturated carboxylic acids and esters thereof, including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methyl methacrylate, ethyl methacrylate, butyl methacrylate, glycidyl methacrylate, and the like; and including esters of maleic and fumaric acid, and the like; amides of the α,β-olefinically unsaturated carboxylic acids such as acrylamide, and the like, divinyls, diacrylates and other polyfunctional monomers such as divinyl benzene, divinyl ether, diethylene glycol diacrylate, ethylene glycol dimethacrylate, methylene-bis-acrylamide, allyl pentaerythritol, and the like; and bis (β-chloroethyl) vinyl phosphonate, and the like.

The vinyl chloride and vinylidene chloride polymer, in addition to the ammelinium beta-octamolybdate additive, may contain the usual compounding ingredients known to the art such as fillers, stabilizers, opacifiers, lubricants, processing aids, impact modifiers, plasticizers, antioxidants, and the like.

Smoke retardancy may be measured using an NBS Smoke Chamber according to procedures described in ASTM E662-79 "Test For Specific Optical Density Of Smoke Generated By Solid Materials". Maximum smoke density ($D_m$) is a dimensionless number and has the advantage of representing a smoke density independent of chamber volume, specimen size or photometer path length, provided a consistent dimensional system is used. Percent smoke reduction is calculated using the equation:

$$\frac{Dm/g \text{ of control} - Dm/g \text{ of sample}}{Dm/g \text{ of control}} \times 100$$

The term "Dm/g" means maximum smoke density per gram of sample. Dm and other aspects of the physical optics of light transmission through smoke are discussed fully in the ASTM publication.

The smoke retardant property of ammelinium beta-octamolybdate is illustrated by the following examples.

EXAMPLES 2-3

The following recipe was used:

| Material | Parts by Weight |
|---|---|
| Polyvinyl Chloride Resin* | 100.00 |
| Lubricant** | 2.0 |
| Tin Stabilizer*** | 2.0 |
| Ammelinium Beta-Octamolybdate | 5.0 |

*Homopolymer of vinyl chloride having an inherent viscosity of about 0.98–1.04; ASTM classification GP-5-15443.
**A commercial polyethylene powder lubricant (Microthene 510).
***Tin Thioglycolate.

The ingredients of the recipe were dry-mixed and bonded on a two-roll mill for about 5 minutes at a roll temperature of about 160° C. The milled compositions were pressed into 6×6×0.025 inch sheets. Pressing was done at about 160° C. for five minutes using 40,000 pounds (about 14,900 Kg) of force applied to a 4-inch ram. The sample received a two minute preheat before being pressed. The same recipe except for the omission of the ammeline beta-octamolybdate and the same sample preparation procedures were used to prepare the control sample.

The molded samples were cut into 2⅝×2⅝×0.50 inch sections. Testing was performed using the flaming mode of the NBS Smoke Chamber Test (ASTM E662-79) described heretofore. Test results are given in Table I.

TABLE I

| Example | Dm/g* | Smoke/Reduction % |
|---|---|---|
| Control | 74.54 | — |
| 2 | 25.66 | 65 |
| 3 | 25.54 | 66 |

*Dm/g Maximum smoke density per gram of sample.

The improved smoke retardant vinyl chloride and vinylidene chloride polymer compositions obtained by the addition of ammelinium beta-octamolybdate to the compositions are useful wherever smoke resistance is desirable, such as in carpets, house siding, plastic components for airplane and passenger car interiors, and the like.

I claim:

1. Ammelinium beta-octamolybdate characterized by major x-ray diffraction peaks at "d" spacings of 9.90 Å, 9.15 Å, 5.96 Å, 3.62 Å, 3.47 Å, 3.30 Å and 3.16 Å.

2. A smoke retarded composition comprising a vinyl chloride or vinylidene chloride polymer together with a smoke retardant amount of the amine molybdate of claim 1.

3. The smoke retarded composition of claim 2 wherein said amine molybdate has an average particle size from about 0.1 to about 100 microns.

4. The composition of claim 2 wherein said amine molybdate is present in an amount from 0.01 to about 20 parts by weight per 100 parts by weight of said polymer.

* * * * *